United States Patent Office 2,710,223
Patented June 7, 1955

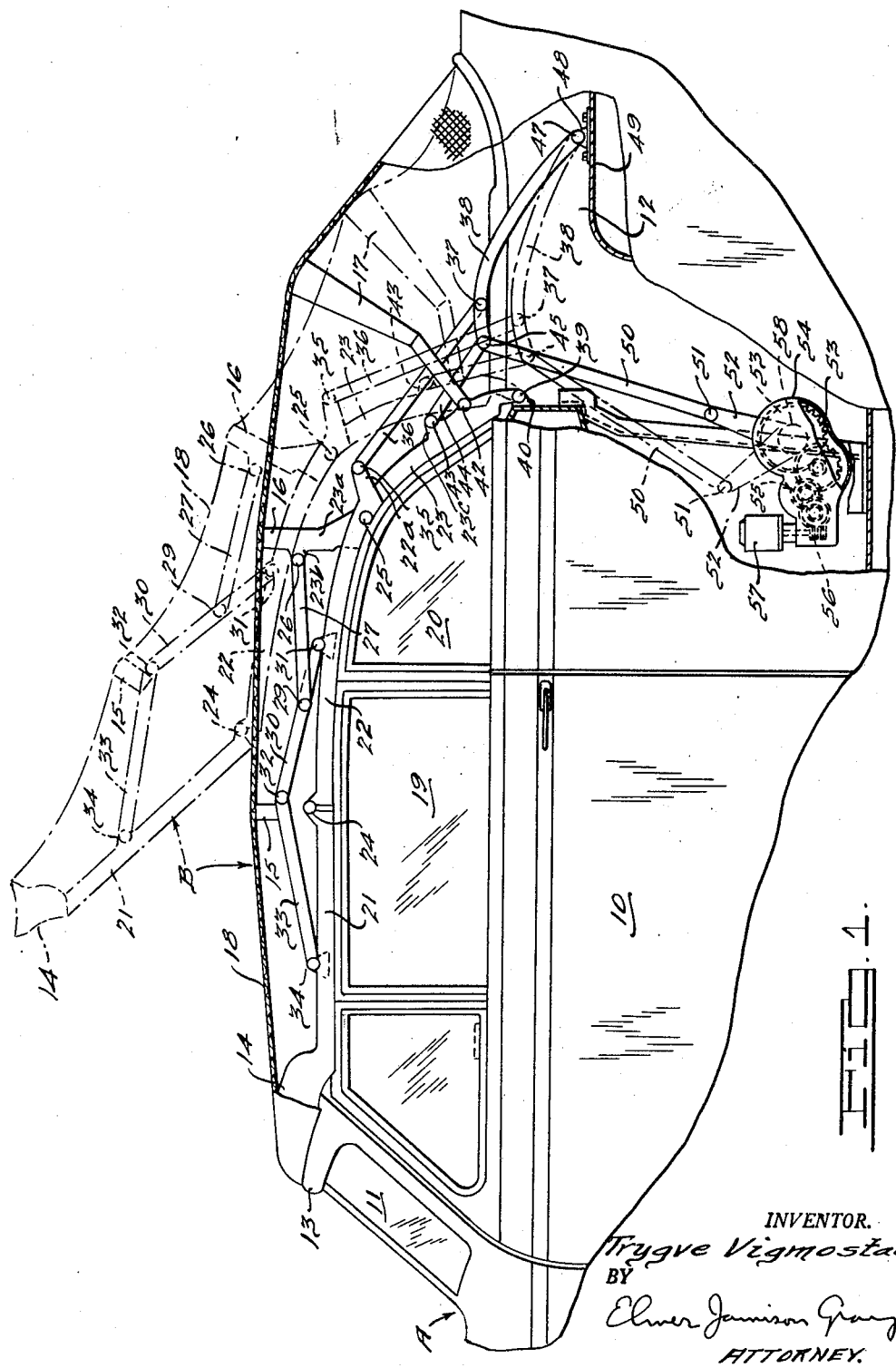

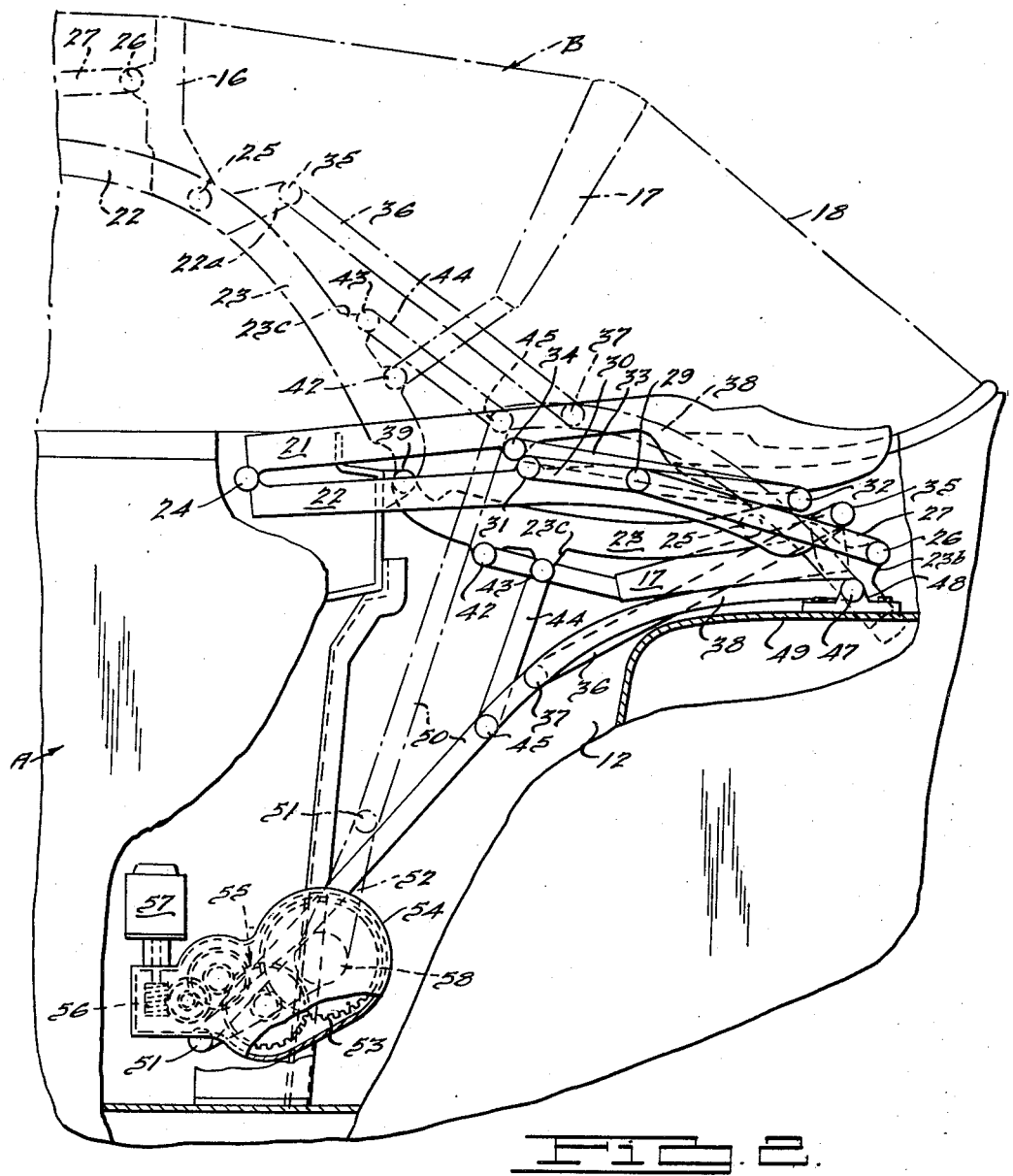

2,710,223

FOLDABLE TOP FOR A VEHICLE BODY

Trygve Vigmostad, Detroit, Mich., assignor to Briggs Manufacturing Co., Detroit, Mich., a corporation of Michigan Application July 1, 1952, Serial No. 296,551

4 Claims. (Cl. 296—117)

This invention relates to vehicle bodies and more particularly to automobile bodies of the so-called convertible type having foldable or collapsible tops.

An object of the invention is to provide an automobile or other vehicle body of the convertible type having a foldable top assembly, including a fabric covering, which is of improved construction capable of being positively unfolded into open position so as to assume the desired position with respect to the sides of the body and the windshield header thereof, and also capable of being folded or collapsed into the body, as a compact unit occupying a minimum of space.

A further object of the invention is to provide improved power driven mechanism for opening the top assembly and folding it into the body, the construction of the top assembly and the mechanism for operating it being such as to render the opening and folding movements of the top smoother, faster and more reliable than heretofore.

Another object of the invention is to provide in an automobile body a collapsible or foldable top having improved link, lever and side rail mechanism so constructed and arranged as to function efficiently and positively between the fully open and closed limits of movement of the top, and in addition to provide improved power actuated means for operating said mechanism.

In accordance with the particular embodiment of the invention herein illustrated the folding top structure comprises rear and intermediate side rail sections hinged together so as to unfold the intermediate rail section to a position in advance of the rear rail section when the top is unfolded. A vertically swinging link having a rear end pivotally connected to the body is pivotally connected adjacent its forward end to a pair of toggle links. When the top is in unfolded condition, the pair of toggle links extend forward from the swinging link substantially in linear alignment therewith and are pivotally connected at their forward ends respectively to the intermediate and rear rail sections so as to exert forward thrusts thereon by virtue of the unfolded double toggle system formed by these links with the swinging link. A generally endwise shiftable rod extends substantially perpendicularly to the swinging link when the top is unfolded and is shifted by power means, so as to swing the swinging link downward in an action to fold the double toggle system or to swing the swinging link upward in an action to unfold the double toggle system.

By virtue of the improved construction, upon unfolding of the toggle formed by the link connected with the intermediate rail section, the latter is forced forward to the fully unfolded condition by the powerful toggle force which increases in magnitude at right angles to the direction of movement of the endwise shiftable rod as the toggle link approaches linear alignment with the swinging link. On folding the toggle system, an initial powerful reverse or rearward force is of course applied by the toggle system to initiate rearward folding of the top. Thereafter, as the swinging link swings downward, the two toggle links are pulled downward, which in turn pull the rear and intermediate rail sections rearward and downward to the folded condition.

Other objects of this invention will appear in the following description and appended claims, reference being had to the accompanying drawings forming a part of this specification wherein like reference characters designate corresponding parts in the several views.

Fig. 1 is a fragmentary side elevation, partly broken away and in section, illustrating a foldable or collapsible top for an automobile body constructed in accordance with the present invention, the top being shown partially folded in broken lines.

Fig. 2 is an enlarged fragmentary side elevation, partly in section and partly broken away, illustrating the top in its folded or collapsed condition within a compartment in the rear of the vehicle, a portion of the top when opened being shown in broken lines.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, a foldable or collapsible top constructed in accordance with one embodiment of the present invention as applied to a convertible body of the two door type. It will be understood that the invention may be utilized in connection with other types of vehicles or automobile bodies, such as convertible bodies of the four door type. The body A is provided with a door 10 at each side, a windshield 11, and a collapsible or foldable top B adapted to be folded into a compartment or space 12 located between the rear seat of the body and the rear deck compartment, as illustrated in Fig. 2.

The windshield 11 terminates at its upper edge in a rigid transverse header 13, and the collapsible top B terminates at its forward edge in a transverse hollow header 14 adapted to engage the upper edge of the header 13 and to be drawn down and clamped thereto by suitable manually operable mechanism located principally within the header 14 and actuated by means of a handle (not shown) accessible to the front seat passenger at a point above the windshield. When the header 14 of the foldable top is forced down into engagement with the header 13 of the windshield, it is preferably located in position by means of upright locating pins or studs on the windshield header 13. Although the clamping mechanism for securing the header 14 of the foldable top to the windshield header 13 may take any suitable form, it is preferably constructed in accordance with United States Letters Patent No. 2,411,945, issued Dec. 3, 1946.

The collapsible or foldable top B includes a front bow 15, an intermediate or middle bow 16, and a rear bow 17 over which the fabric 18 of the top is stretched, the fabric being securely fastened to these bows in any conventional manner. The opposite side edges of the fabric 18 are attached to the foldable side rails forming a part of the top assembly and hereinafter more fully described. The front edge portion of the fabric 18 covers and is secured to the header 14 and the rear edge thereof is attached to the body around the upper rear edge of the compartment 12. Slidably mounted within the door 10 in the usual manner is a glass panel 19. Mounted within the body immediately in rear of the slidable panel 19 is a glass quarter panel 20 which is preferably mounted so as to move upwardly or downwardly into a well within the body.

The construction of the foldable top with reference to the side rails and operating linkage for the bows 15, 16 and 17 is the same at each side of the body, and hence it will suffice to illustrate and describe the structure at one side of the body only. The foldable top is provided at each side with a sectional side rail extending from the header 14 to the rear of the body at a point adjacent the front upper edge of the compartment 12. This sectional side rail comprises a front rail section 21, an intermediate or middle rail section 22, and a rear rail section 23.

The rail sections 21 and 22 are arranged end to end in abutting relation when the top is unfolded and are hinged together at 24 so that the front rail section 21 may fold back over the intermediate section 22 when the top is collapsed as shown in Fig. 2. The rear end of the rail section 22 overlaps the forward end of the rear rail section 23, and these sections are pivoted together at 25 at the regions where the sections overlap. The rear rail section 23 has a lever arm or extension 23a projecting beyond the pivot 25 and vertically when the top is unfolded, as shown in Fig. 1. The extensions 23a at opposite sides of the vehicle are joined in any suitable manner to the ends of the middle bow 16.

Each extension 23a of the rear rail section has an offset arm 23b to which is pivoted at 26 a link 27. This link extends forwardly in the unfolded position of the top and is pivoted at 29 to an intermediate portion of a link 30. This latter link is pivoted at 31 to the intermediate rail section 22 at a suitable point between the ends thereof and in the normal unfolded position of the top extends forwardly and upwardly with respect to the side rail section 22, as illustrated in Fig. 1. The inclined link 30 at its forward end is pivoted at 32 to a second inclined link 33 which extends downwardly and forwardly and is pivoted at its forward end at 34 to the front rail section 21 at a suitable point between the ends thereof. Thus, it will be seen that the arm or lever extension 23a of the rear rail section 23 is operatively connected to the front rail section through the medium of the articulated links 27, 30 and 33, power being transmitted by the lever extension 23a from a point well above the rail section 22. The link 30 is rigidly secured near the pivot 32 to an end of the front bow 15.

The intermediate side rail section 22 has an arm or lever extension 22a extending rearwardly of the pivot 25, and each of these arm extensions of the top is pivoted at its rear end at 35 to the upper end of a toggle link 36. In the normal open position of the top each toggle link 36 extends downwardly and rearwardly alongside the rear rail section 23 and is pivoted at its rear end at 37 to a relatively long rear toggle or swinging link 38 at a suitable location adjacent and rearward of the forward end of the latter. The lower end of each rear rail section 23 is pivoted at 39 to a fixed bracket 40 at a point somewhat below and forwardly of the pivot 37 of the toggle link 36 when the top is unfolded. From the foregoing it will be seen that the rear rail sections 23 will swing between the unfolded and folded positions of the top B about the pivots 39 which lie on a common transverse axis. Each end of the rear bow 17 is pivoted at 42 to one of the rear rail sections 23 at a point suitably in advance of the axis of swinging of the rear rail section.

The foldable top in the present embodiment is operated through the medium of mechanism arranged at each side of the body and driven through a single reversible electric motor. Each of these mechanisms is connected to a rear rail section 23 and to a fixed portion of the body, and the construction is such that during operation of the electric motor the mechanism at opposite sides of the body will operate in synchronism to raise and lower the top with maximum smoothness. Each mechanism includes a double toggle system connected to the intermediate and rear rail sections 22 and 23 and to a fixed portion of the body, the links of the double toggle system being actuated to fold the top into the compartment 12, as shown in Fig. 2, or to unfold and extend it to the position shown in Fig. 1.

A toggle link 44 is pivoted at its forward end at 43 to a projection 23c of each of the rear rail sections 23 somewhat in advance of and above the pivotal connection 42 of the rear bow 17 when the top is unfolded. The rear end of the toggle link 44 is pivoted at 45 to the forward end of the relatively long toggle link 38, which in turn is pivoted at its rear end at 47 to a bracket 48 bolted to the deck 49 of the compartment 12. The links 36 and 44 comprise the operating toggle links for the intermediate and rear rail sections 22 and 23 respectively and in cooperation with their common toggle link 38 are operated in synchronism as the aforesaid double toggle system interposed between the rear rail section and a fixed rear portion of the body, the pivots 37 and 45 between these links comprising the toggle joints.

The double toggle system at each side of the body is actuated by means of an endwise shiftable push and pull link 50 which is pivoted at its upper end to the toggle joint at the pivot 45. The link 50 extends downwardly and forwardly to a point immediately above the floor of the tonneau, its lower end being pivoted at 51 to a crank or lever arm 52. The crank arm 52 at the left side of the vehicle body is rigidly secured to a gear 53 suitably journalled within a housing 54 which is in turn rigidly secured to the left side of the body.

The gear 53 is connected by a gear chain, indicated generally by the numeral 55, to a motor driven worm gear 56 which is driven by an electric motor 57. The two crank arms 52 at opposite sides of the body are also keyed to a transverse shaft 58 coaxial with the gear 53. Thus, through the medium of the transverse shaft 58, the crank arms 52 at opposite sides of the body will operate in synchronism and, hence, will reciprocate the links 50 so as to actuate the double toggle system, including the links 36 and 44, at opposite sides of the body synchronously. With the top in folded condition as shown in Fig. 2, operation of the electric motor 57, which may be initiated by a push button on the instrument panel, will swing the arms 52 in synchronism from the position shown in Fig. 2 to the position shown in Fig. 1. Due to their arrangement, the lever arms 52 will transmit substantially an endwise upward movement to the toggle operating links 50. These operating links 50 will shift the toggle joints 37 and 45 in an upward direction, thus transmitting substantially an endwise upward movement to the toggle links 36 and 44 during the initial stages of the opening movement of the top.

It will be observed that the double toggle system comprises the operating connection between the main operating link 50 and the top assembly, the force exerted by this toggle system at each side of the vehicle body being transmitted directly to the rear side rail section 23 through toggle link 44 and directly to the intermediate side rail section 22 through toggle link 36. Since the long link 38 of the toggle system is pivotally secured in place at the fixed point 47, the operating toggle links 36 and 44 are subjected to all of the motivating force of the toggle system, which is considerable. Each toggle system as well as the actuating link 50 therefor and the lever arm 52 are so arranged that at the commencement of the opening movement of the top from the folded position thereof shown in Fig. 2, the links 44 and 50 move in unison in an upward endwise direction accompanied by a vertical and rearward movement of the pivot 51 on a relatively flat arc. Simultaneously, the link 36 acting on the extension 22a swings the intermediate rail section 22 forward, thus gaining a considerable mechanical advantage during the initial stage of opening movement of the top. As the top B unfolds, the double toggle system likewise unfolds until at the completely unfolded position of the top, Fig. 1, substantially the maximum force of the toggle system is applied endwise of the links 36 and 44. By virtue of the connections of these links at the projections 22a and 23c of the intermediate and rear side rail sections respectively, substantially the maximum toggle force is applied to force the rail sections 22 and 23 forward and downward, causing the header 14 to seat firmly against the header 13. Upon downward movement of the links 50, the toggle links 36 and 44 are pulled rearward and downward so as to swing the side rail sections rearward to their folded positions within the compartment 12. As a result of the improved construction wherein the gear 53, lever arms 52, and endwise shiftable links 50 are utilized in conjunction with the toggle links 36 and 44, greater power is available in shifting the top assembly as well as faster and smoother operation.

I claim:

1. In a vehicle body, a foldable top having hingedly connected rear and intermediate side rail sections adapted to extend end to end when the top is unfolded, a vertically swinging link having a rear end pivoted on the body, a pair of toggle links having one end of each pivoted on forward portions of the swinging link, said toggle links extending in a generally forward direction from the swinging link when the top is unfolded, the rear rail section having a portion spaced from the pivotal connection thereof with the body to swing rearwardly during the initial folding movement of the top and one of said toggle links having its other end pivoted on said portion of the rear rail section, said intermediate rail section having a portion spaced from the hinge connection thereof with the rear rail section to swing rearwardly during the initial folding movement of the top and the other of said toggle links having its other end pivoted on said portion of the intermediate rail section, and means for swinging said swinging link vertically.

2. In a vehicle body, a foldable top having hingedly connected rear and intermediate side rail sections adapted to extend end to end when the top is unfolded, a vertically swinging link having a rear end pivoted on the body, a pair of toggle links each having a lower end pivoted on forward portions of the swinging link, said toggle links extending in a generally forward direction from their lower ends when the top is unfolded, the rear rail section having a portion spaced upwardly from the pivotal connection thereof with the body to swing rearwardly during the initial folding movement of the top, one of said toggle links having its upper end pivoted on said portion of the rear rail section, said intermediate rail section having a portion spaced rearward from the hinge connection thereof with the rear rail section to swing rearwardly during the initial folding movement of the top, the other of said toggle links having its upper end pivoted on said portion of the second rail section, and means for swinging said swinging link vertically.

3. In a vehicle body, a foldable top having hingedly connected rear and intermediate side rail sections adapted to extend end to end when the top is unfolded, the rear rail section being pivotally connected adjacent its rear end to the body, the intermediate rail section having an integral portion projecting rearwardly of the hinge connection between the rear and intermediate rail sections when the top is unfolded, a vertically swinging link having a rear end pivoted on the body, means for swinging said link vertically, a pair of toggle links, each pivoted adjacent one end on a forward portion of the swinging link and extending in a generally forward direction from the swinging link when the top is unfolded, the other end of one of said toggle links being pivoted on an integral portion of the rear rail section above the pivotal connection of the latter with the body, the other end of the other toggle link being pivoted on said portion of the intermediate rail section.

4. In a vehicle body, a foldable top having hingedly connected rear and intermediate side rail sections adapted to extend end to end when the top is unfolded, the rear rail section being pivotally connected adjacent its rear end to the body, the intermediate rail section having an integral portion projecting rearwardly of the hinge connection between the rear and intermediate rail sections when the top is unfolded, a vertically swinging link having a rear end pivoted on the body, means for swinging said link vertically, a pair of toggle links, each pivoted adjacent one end on a forward portion of the swinging link and extending in a generally forward direction from the swinging link when the top is unfolded, the other end of one of said toggle links being pivoted on an integral portion of the rear rail section below said portion of the intermediate rail section and above the pivotal connection of the rear rail section with the body, the other end of the other toggle link being pivoted on said portion of the intermediate rail section, the pivotal connection of the last named toggle link with the swinging link being rearward of the pivotal connection of the latter link with the other toggle link.

References Cited in the file of this patent

UNITED STATES PATENTS

| 2,297,820 | Westrope | Oct. 6, 1942 |
| 2,498,868 | Vigmostad | Feb. 28, 1950 |

FOREIGN PATENTS

| 647,031 | Great Britain | Dec. 6, 1950 |